United States Patent
Kinnear

(10) Patent No.: US 7,841,132 B1
(45) Date of Patent: Nov. 30, 2010

(54) WATERING JUG FOR HANGING PLANTS

(76) Inventor: Duane Kinnear, 11770 W. Ridge Rd., East Springfield, PA (US) 16411

( * ) Notice: Subject to any disclaimer, the term of this patent is extended or adjusted under 35 U.S.C. 154(b) by 569 days.

(21) Appl. No.: 11/810,314

(22) Filed: Jun. 4, 2007

(51) Int. Cl.
*A01G 25/14* (2006.01)
(52) U.S. Cl. ........................................ 47/48.5
(58) Field of Classification Search ............... 47/48.5, 47/79, 40.5, 67, 59 R, 58.1 R, 59 S, 21.1, 47/80, 60, 61, 62 R, 62 A, 62 C, 62 E, 62 N, 47/1.01 R; 222/372, 386, 387, 501, 510, 222/526–537; 239/333, 334, 354, 355, 361–363, 239/375–377, 378; D23/499, 212, 213; 417/472, 417/569, 571; D8/2; 137/565.25, 565.17, 137/565.01; *A01G 25/14*
See application file for complete search history.

(56) References Cited

U.S. PATENT DOCUMENTS

| | | | | |
|---|---|---|---|---|
| 1,120,848 A | * | 12/1914 | Pointon | 261/24 |
| 2,345,220 A | * | 3/1944 | Sarchet | 215/3 |
| 2,612,403 A | * | 9/1952 | Burch | 239/318 |
| 3,198,405 A | * | 8/1965 | Pfeil | 222/400.8 |
| D266,450 S | * | 10/1982 | Swett et al. | D23/212 |
| 4,447,983 A | * | 5/1984 | Shinada | 47/48.5 |
| 5,315,787 A | * | 5/1994 | Schleicher et al. | 47/79 |
| 6,669,113 B2 | * | 12/2003 | Halle | 239/320 |
| 6,695,225 B2 | * | 2/2004 | Yanagida | 239/333 |
| D505,182 S | * | 5/2005 | Durant et al. | D23/212 |
| 2005/0017088 A1 | * | 1/2005 | Denton | 239/333 |

\* cited by examiner

*Primary Examiner*—Son T Nguyen
*Assistant Examiner*—Shadi Baniani
(74) *Attorney, Agent, or Firm*—Richard K Thomson

(57) ABSTRACT

A watering jug reliably delivers water to a hanging plant, or the like. A manually operable pump sits atop an intake tube; a valve positioned at a juncture between the intake tube and a discharge tube controls the redirecting of the measured amount of water to the distal end of the discharge tube. An optional sprinkling head may be used. A second embodiment features an extension sleeve which measures out a desired amount of water to the plant.

5 Claims, 3 Drawing Sheets weight: 400;

WATERING JUG FOR HANGING PLANTS

BACKGROUND AND SUMMARY OF THE INVENTION

The present invention is directed to the field of plant care. More particularly, the present invention is directed to a watering jug for facilitating the watering of hanging plants.

Providing hanging plants with proper amounts of water and fertilizer has always been problematic. First, there is the problem of being able to reach, this problem having a variety of magnitudes, depending on the height of the plant care giver. Second, this problem of reach, typically, precipitates a spillage problem. Third, due in part to the inability to actually see the surface receiving the water and the resultant spillage, the amount of water actually received by the plant is in question; some plants are particularly sensitive to over-watering and most every plant likely to be suspended is going to be offended if it is under-watered.

The watering jug of the present invention permits the plant care giver to reliably deliver water to a hanging plant which may be several feet above her/his head. The water jug of the present invention comprises a) a container for receiving a quantity of water to be dispensed; b) a lid securable to a top portion of the container; c) an intake tube extending through the lid; d) a manually operable pump sitting atop the intake tube, the pump drawing a measured amount of water into the intake tube e) a discharge tube forming a juncture with, and extending outwardly from, the intake tube at a point beneath the pump; f) a valve in the intake tube at the juncture allowing the pump to draw the measured amount of water from the container through the intake tube and redirect it into the discharge tube; g) an elongated delivery tube extending from the discharge tube; whereby the watering jug enables a person to deliver a measured amount of water conveniently and reliably to a hanging plant positioned several feet above her/his head. Preferably, the distal end of the elongated delivery tube has a curved portion to render its discharge opening downwardly directed. A rigid brace extends upwardly from the lid and is clipped in a plurality of places to the discharge tube to maintain the discharge tube in an upwardly angled position. The lid has an opening in a rear portion thereof to permit filling of the jug without removing the lid. In a second embodiment, the intake tube has a displaceable extension to allow a fixed amount of water to be pumped to the plant by positioning the delivery end just beneath the surface of the water and pumping until the end of the tube no longer reaches. Then, the intake tube may be lowered a notch and the process repeated for the next plant.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
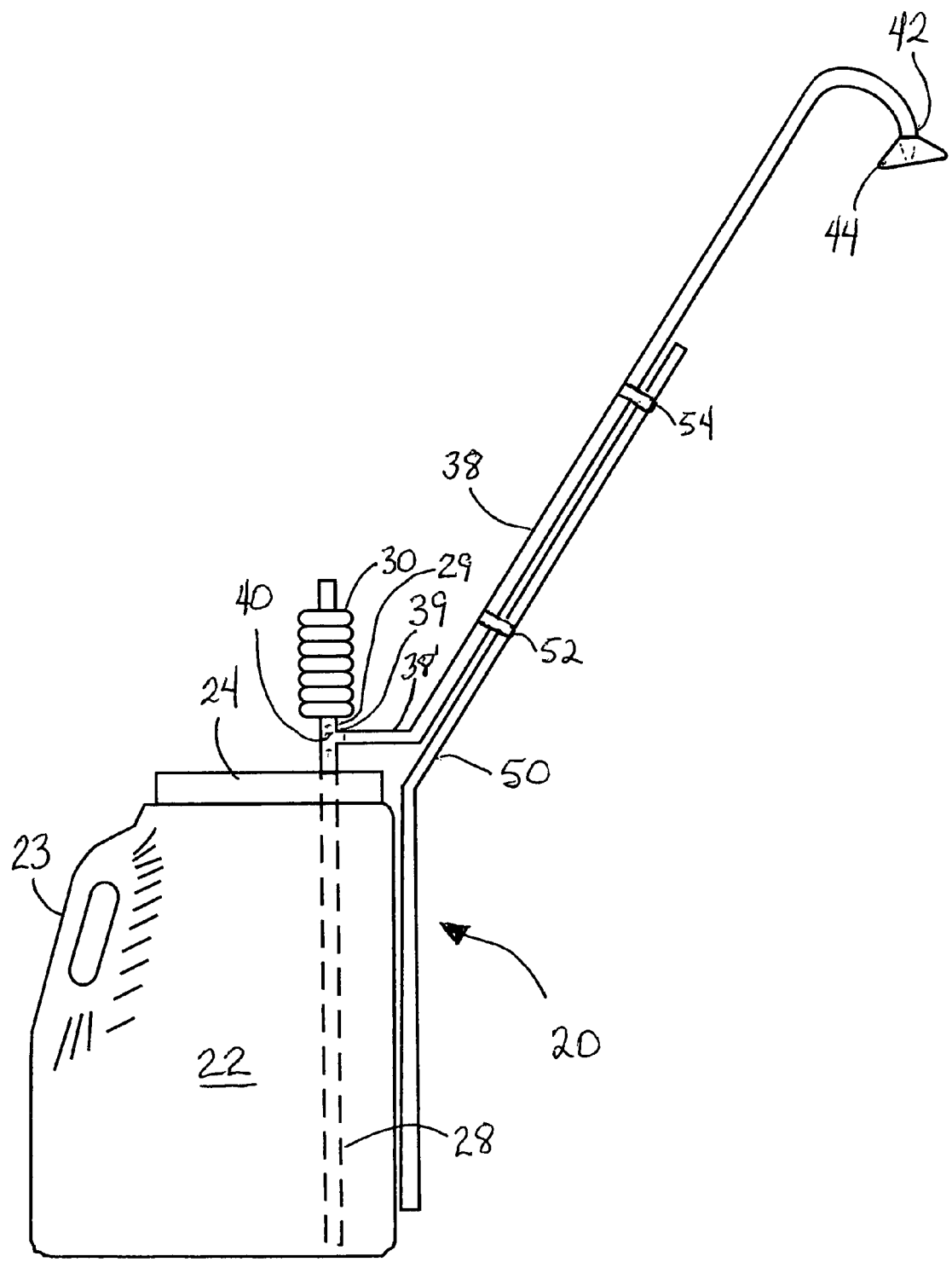
FIG. 1 is a side view of a first embodiment of the watering jug of the present invention.
Figure 2:
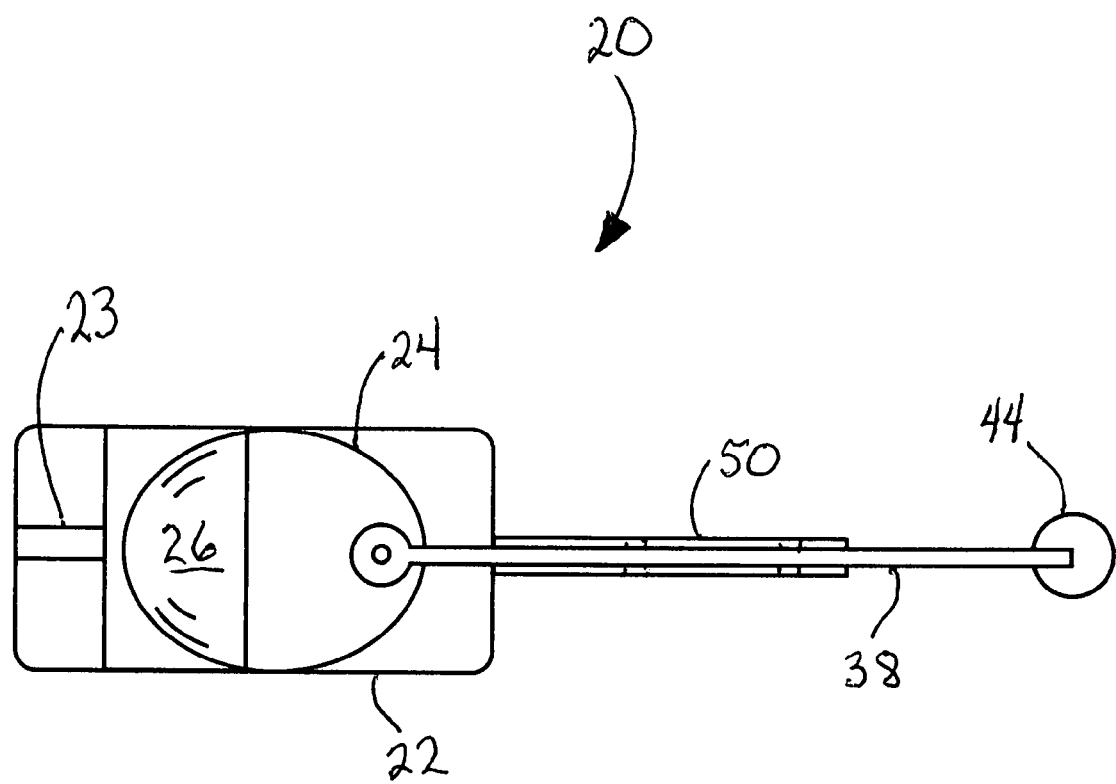
FIG. 2 is a top view of the first embodiment.

A first embodiment of the watering jug of the present invention is depicted in FIGS. 1 and 2 generally at 20. Watering jug 20 comprises a container 22 for receiving a quantity of water to be dispensed to plants. Handle 23 formed integrally in the plastic container 22 facilitates handling of the container 22. While watering jug 20 is adapted to facilitate watering of hanging plants, obviously it can be used to water plants in other planters, pots, etc. A lid 24 having an opening 26 (FIG. 2) at a rear portion for permitting filling of container 22 is attached to the top thereof. Intake tube 28 extends through lid 24 and has a pump 30 secured to a top portion 29 thereof. Pump 30 is manually operable and, depending on how much and how often pump 30 is collapsed/compressed, an amount of water is drawn into intake tube and, on subsequent compressions, dispensed through discharge tube 38 to the plant (not shown). Discharge tube 38' forms a juncture 39 with, and extends outwardly from intake tube 28 at a point below pump 30. Flapper valve 40 positioned inside the juncture 39 operates to permit pump 30 to draw water into intake tube 28 and then reroutes the water into discharge tube 38'. Discharge tube 38' is connected to an elongated delivery tube 38 which extends upwardly from discharge tube 38' at an angle to facilitate reaching hanging plants by a distance which exceeds the overall length of the container 22. Rigid brace 50 is formed as part of the container lid 24 and extends upwardly at an angle α beneath delivery tube 38. Clips 52, 54 secure delivery tube 38 to rigid brace 50 to prevent it from sagging or twisting laterally. A sprinkling head 44 may optionally be attached to distal end 42 of delivery tube 38, sprinkling head 44 showering/misting the water onto the plant. Alternatively, sprinkling head 44 may be omitted and the end of delivery tube 38 narrowed to form a supply nipple, as indicated by the dotted lines.

Figure 3:
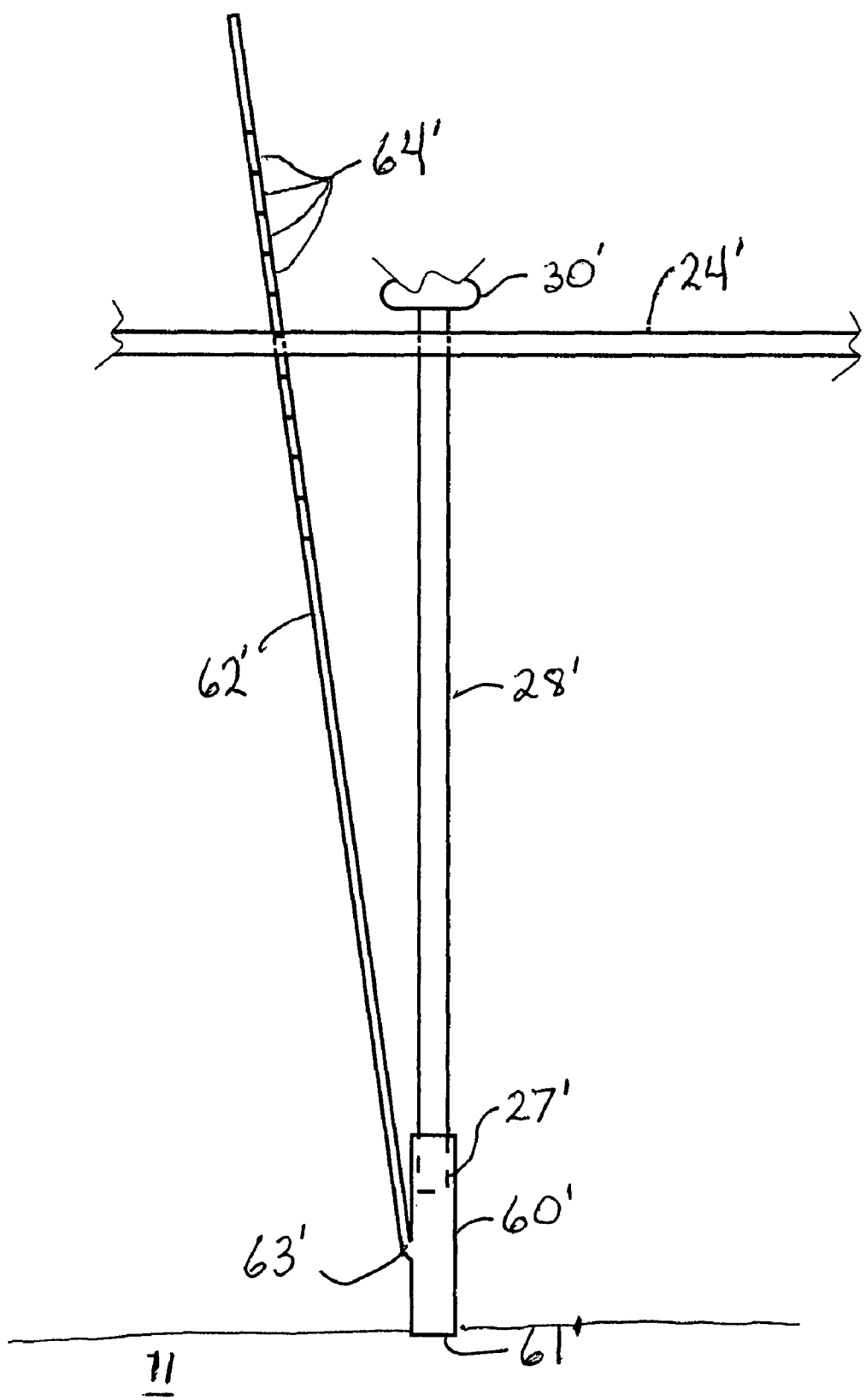
FIG. 3 is a schematic side view of a modified supply tube for a second embodiment.
Figure 1:
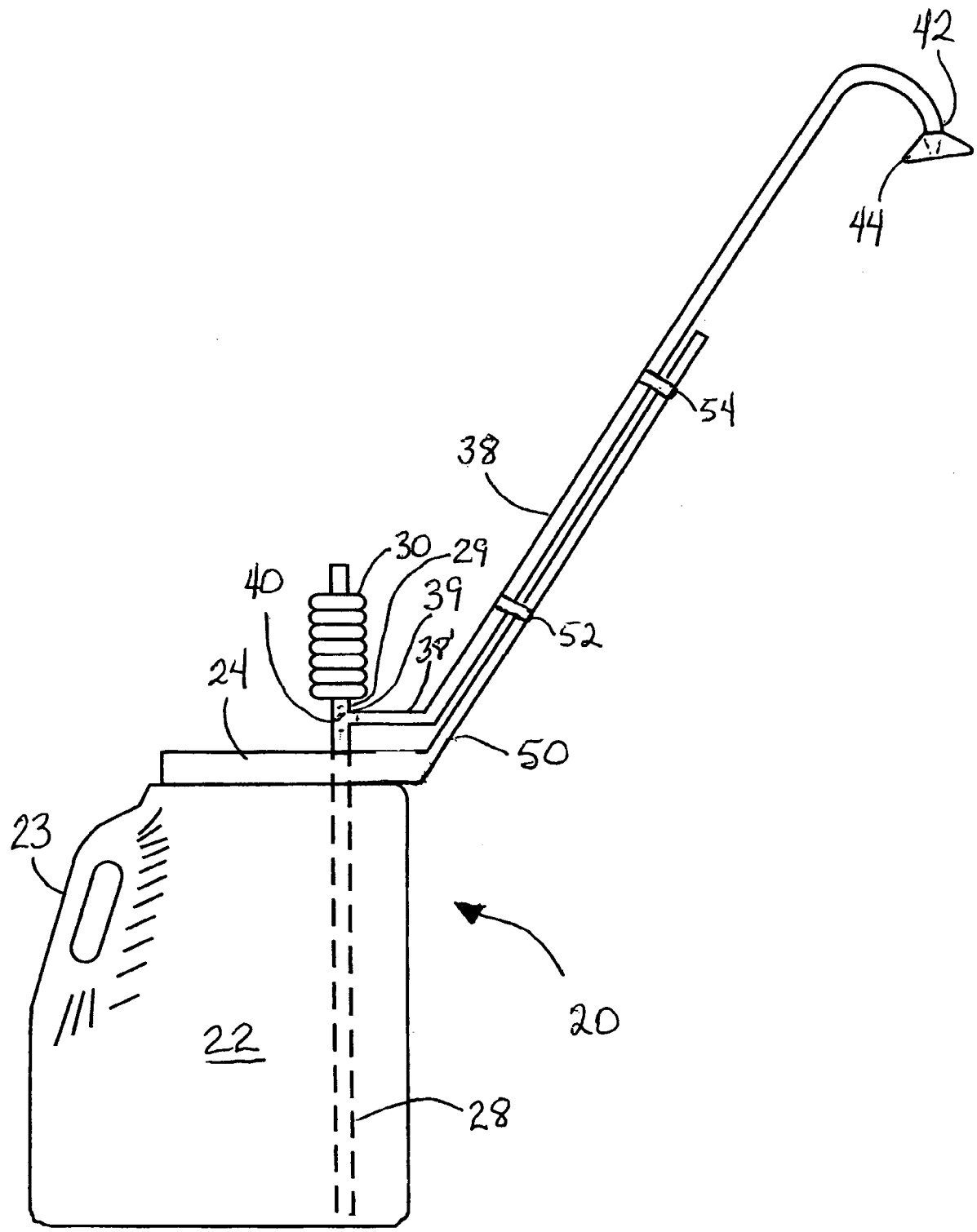

FIG. 3 depicts an alternative configuration of the supply tube 28'. In this second embodiment, intake tube 28' has extension sleeve 60' which slides over its distal end 27'. Adjustment handle 62' has a plurality of teeth 64' thereon and extends from its place of attachment 63' to extension sleeve 60' through container lid 24'. The purpose of extension sleeve 60' is to permit a measured amount of water to be delivered to each plant by immersing the end 61' in water 11 in the watering jug. The manual pump 30' is repeatedly squeezed until the level of water 11 is lowered to where end 61' no longer reaches the surface of water 11. The extension sleeve 60' may then be lowered by the length of a tooth 64' and a measured amount of water dispensed to the next plant.

The watering jug 20 of the present invention enables a plant care giver to deliver water reliably to a plant at the desired location. The capacity of pump 30 controls the amount of water drawn up into intake tube 28 with valve 40 delivering an amount of water to discharge tube 38 and, through sprinkling head 44 to the plant. If it is desired to have a better idea of the amount of water delivered to each plant, the features of the second embodiment shown in FIG. 3 can be implemented such that the extension sleeve 60' can be lowered a fixed amount to deliver a measured amount of water.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

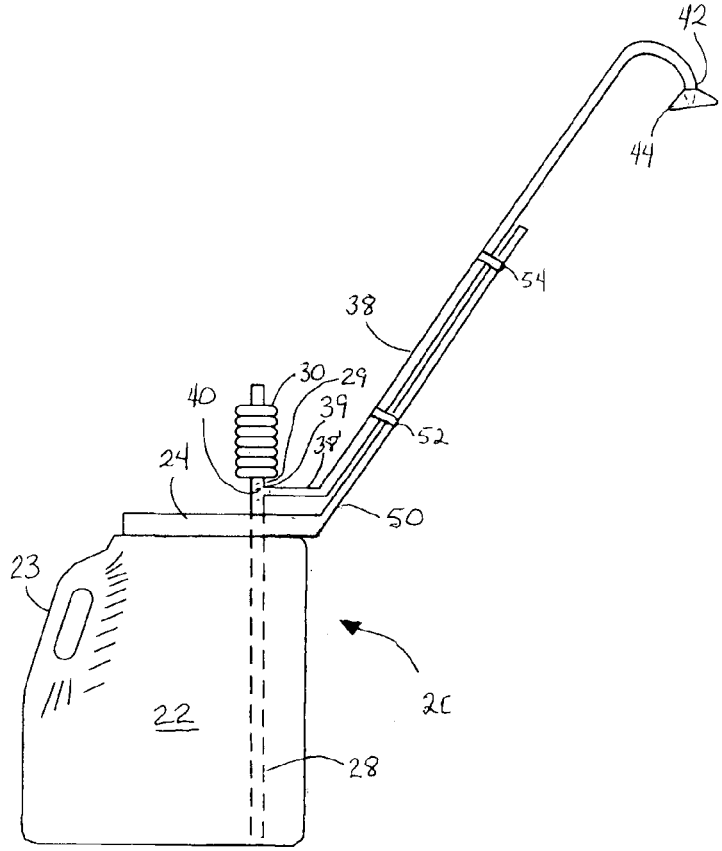

I claim:

1. A watering jug for dispensing a measured amount of water to hanging plants, said jug comprising
   a) a container for receiving a quantity of water to be dispensed;
   b) a lid securable to a top portion of said container;
   c) an intake tube extending through said lid;
   d) a manually operable pump sitting atop said intake tube, said pump drawing a measured amount of water into said intake tube;
   e) a discharge tube forming a juncture with, and extending outwardly from, said intake tube at a point beneath said pump;
   f) a valve in said intake tube at said juncture allowing said pump to draw said measured amount of water from said container through said intake tube and redirect it into said discharge tube;
   g) an elongated delivery tube extending from said discharge tube a distance exceeding a height of said container;
   whereby said watering jug enables a person to deliver a measured amount of water conveniently and reliably to a hanging plant positioned several feet above her/his head
   h) an extension sleeve formed over an end of said intake tube, said extension sleeve being movable between a plurality of distinctly defined fixed positions;
   i) an adjustment handle attached to said extension sleeve, said adjustment handle having a plurality of teeth formed along at least one side thereof and extending through said lid, said plurality of teeth defining said plurality of distinctly defined fixed positions, a distance between a pair of said plurality of teeth defining a quantity of water which can be extracted from said container and delivered from said end of said delivery tube.

2. The watering jug of claim 1 further comprising a distal end of said elongated delivery tube having a curved portion to render its discharge opening downwardly directed.

3. The watering jug of claim 2 further comprising a sprinkling head affixed to said downwardly directed distal end.

4. The watering jug of claim 1 further comprising a rigid brace extending upwardly from said lid, underlying a significant portion of a length of said delivery tube, and being clipped in a plurality of places to said delivery tube to maintain said delivery tube in an upwardly angled position.

5. The watering jug of claim 1 wherein said lid has an opening in a rear portion thereof to permit filling of said jug without removing said lid.

* * * * *

UNITED STATES PATENT AND TRADEMARK OFFICE
CERTIFICATE OF CORRECTION

PATENT NO.         : 7,841,132 B1
APPLICATION NO.    : 11/810314
DATED              : November 30, 2010
INVENTOR(S)        : Duane Kinnear Page 1 of 3

It is certified that error appears in the above-identified patent and that said Letters Patent is hereby corrected as shown below:

The Title page, showing an illustrative Figure, should be deleted and substitute therefor the attached Title page.

Delete Drawing sheet 1, and substitute therefor the Drawing sheet consisting of FIG. 1, as shown on attached page.

Signed and Sealed this
Twenty-eighth Day of June, 2011

David J. Kappos
*Director of the United States Patent and Trademark Office*

(12) United States Patent
Kinnear

(10) Patent No.: US 7,841,132 B1
(45) Date of Patent: Nov. 30, 2010

(54) WATERING JUG FOR HANGING PLANTS

(76) Inventor: Duane Kinnear, 11770 W. Ridge Rd., East Springfield, PA (US) 16411

(*) Notice: Subject to any disclaimer, the term of this patent is extended or adjusted under 35 U.S.C. 154(b) by 569 days.

(21) Appl. No.: 11/810,314

(22) Filed: Jun. 4, 2007

(51) Int. Cl.
*A01G 25/14* (2006.01)
(52) U.S. Cl. ........................................... 47/48.5
(58) Field of Classification Search ............... 47/48.5, 47/79, 40.5, 67, 59 R, 58.1 R, 59 S, 21.1, 47/80, 60, 61, 62 R, 62 A, 62 C, 62 E, 62 N, 47/1.01 R; 222/372, 386, 387, 501, 510, 222/526–537; 239/333, 334, 354, 355, 361–363, 239/375 377, 378; D23/499, 212, 213; 417/472, 417/569, 571; D8/2; 137/565.25, 565.17, 137/565.01; *A01G 25/14*
See application file for complete search history.

(56) References Cited

U.S. PATENT DOCUMENTS

| 1,120,848 | A | * | 12/1914 | Pointon | 261/24 |
| 2,345,220 | A | * | 3/1944 | Sarchet | 215/3 |
| 2,612,403 | A | * | 9/1952 | Burch | 239/318 |
| 3,198,405 | A | * | 8/1965 | Pfeil | 222/400.8 |
| D266,450 | S | * | 10/1982 | Swett et al. | D23/212 |
| 4,447,983 | A | * | 5/1984 | Shinada | 47/48.5 |
| 5,315,787 | A | * | 5/1994 | Schleicher et al. | 47/79 |
| 6,669,113 | B2 | * | 12/2003 | Halle | 239/320 |
| 6,695,225 | B2 | * | 2/2004 | Yanagida | 239/333 |
| D505,182 | S | * | 5/2005 | Durant et al. | D23/212 |
| 2005/0017088 | A1 | * | 1/2005 | Denton | 239/333 |

* cited by examiner

*Primary Examiner*—Son T Nguyen
*Assistant Examiner*—Shadi Baniani
(74) *Attorney, Agent, or Firm*—Richard K Thomson

(57) ABSTRACT

A watering jug reliably delivers water to a hanging plant, or the like. A manually operable pump sits atop an intake tube; a valve positioned at a juncture between the intake tube and a discharge tube controls the redirecting of the measured amount of water to the distal end of the discharge tube. An optional sprinkling head may be used. A second embodiment features an extension sleeve which measures out a desired amount of water to the plant.

5 Claims, 3 Drawing Sheets